United States Patent [19]

Mojden

[11] 4,351,430

[45] Sep. 28, 1982

[54] MAGNETIC RAIL CONSTRUCTION FOR CAN CONVEYOR

[75] Inventor: Wallace W. Mojden, Hinsdale, Ill.

[73] Assignee: Fleetwood Systems, Inc., Countryside, Ill.

[21] Appl. No.: 146,153

[22] Filed: May 2, 1980

[51] Int. Cl.³ .............................................. B65G 15/58
[52] U.S. Cl. ..................................................... 198/690
[58] Field of Search ................. 198/690, 381; 271/193

[56] References Cited

U.S. PATENT DOCUMENTS 3,338,374  8/1967  Dudley ................................ 198/690
3,830,353  8/1974  Mojden .

FOREIGN PATENT DOCUMENTS 1158466  7/1969  United Kingdom ................ 198/690

*Primary Examiner*—Robert B. Reeves
*Assistant Examiner*—Brian Bond
*Attorney, Agent, or Firm*—Trexler, Bushnell & Wolters, Ltd.

[57] ABSTRACT

A magnetic rail is arranged for use in a conveyor system and includes permanent magnets arranged either in alternately interspersed relationship or in checkerboard pattern regarding relative north and south polarities; and the individual magnets are advantageously selected to have a dimension in the direction of belt travel which is less than the diameter of tinplate containers being transported. When the magnetic rail is used in the bleed-off section of the system, the magnets are selected to be of progressively diminishing transverse dimension relative to the direction of belt travel in order to gradually reduce mangetic attraction as the containers pass down the belt.

5 Claims, 11 Drawing Figures

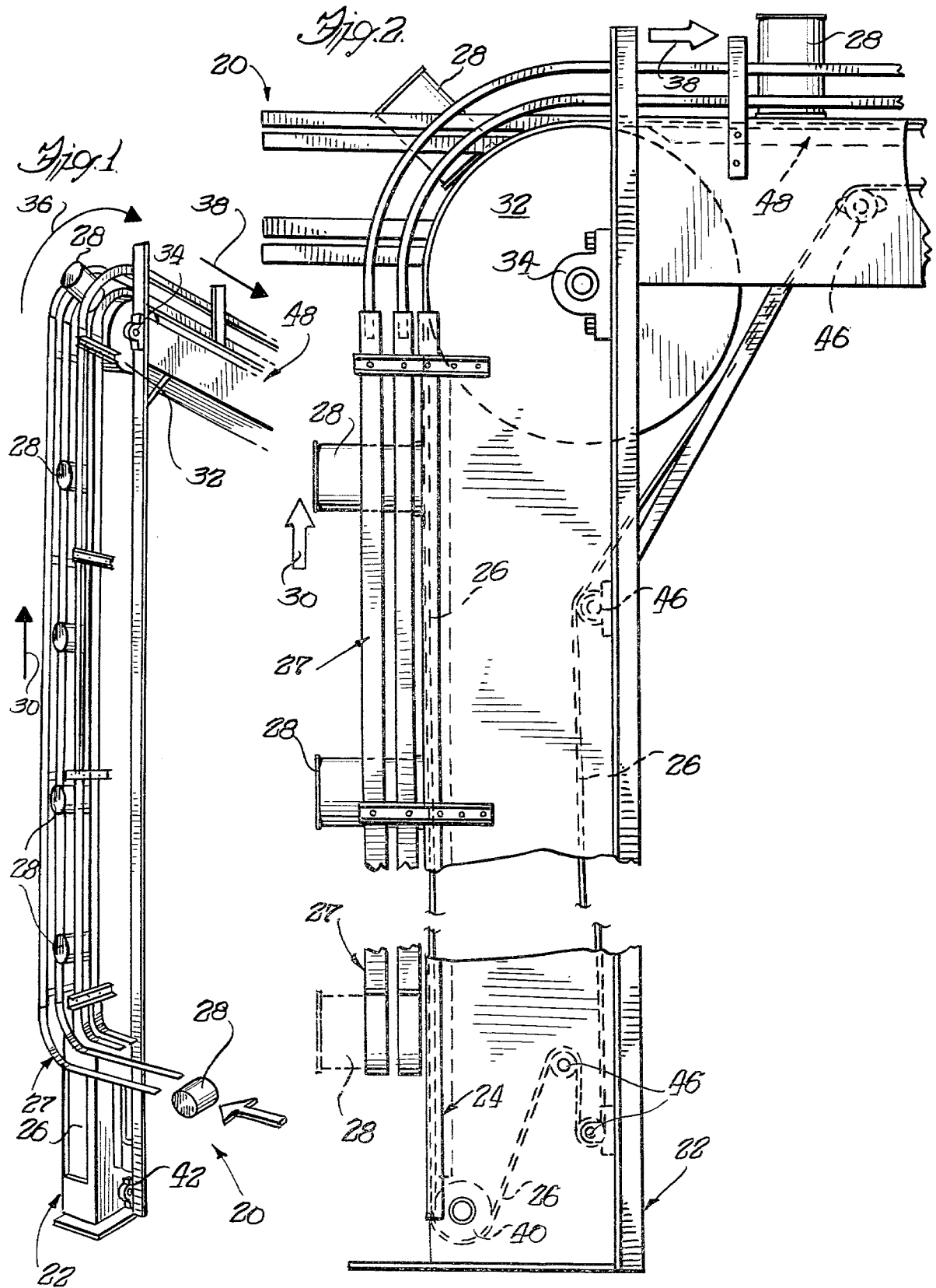

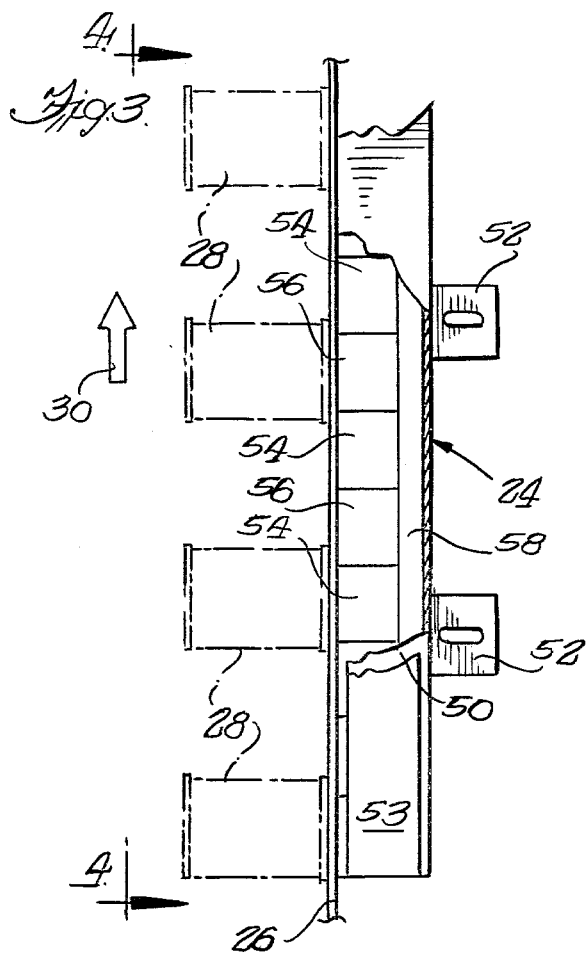
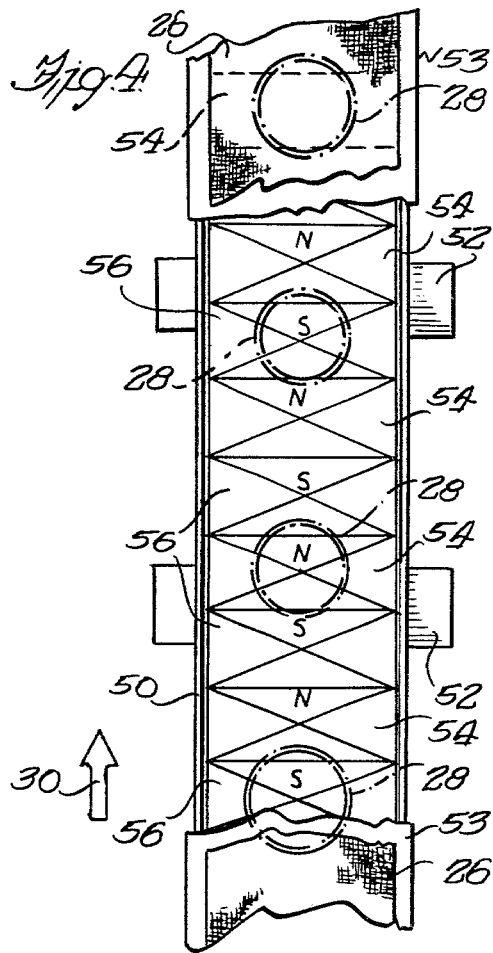
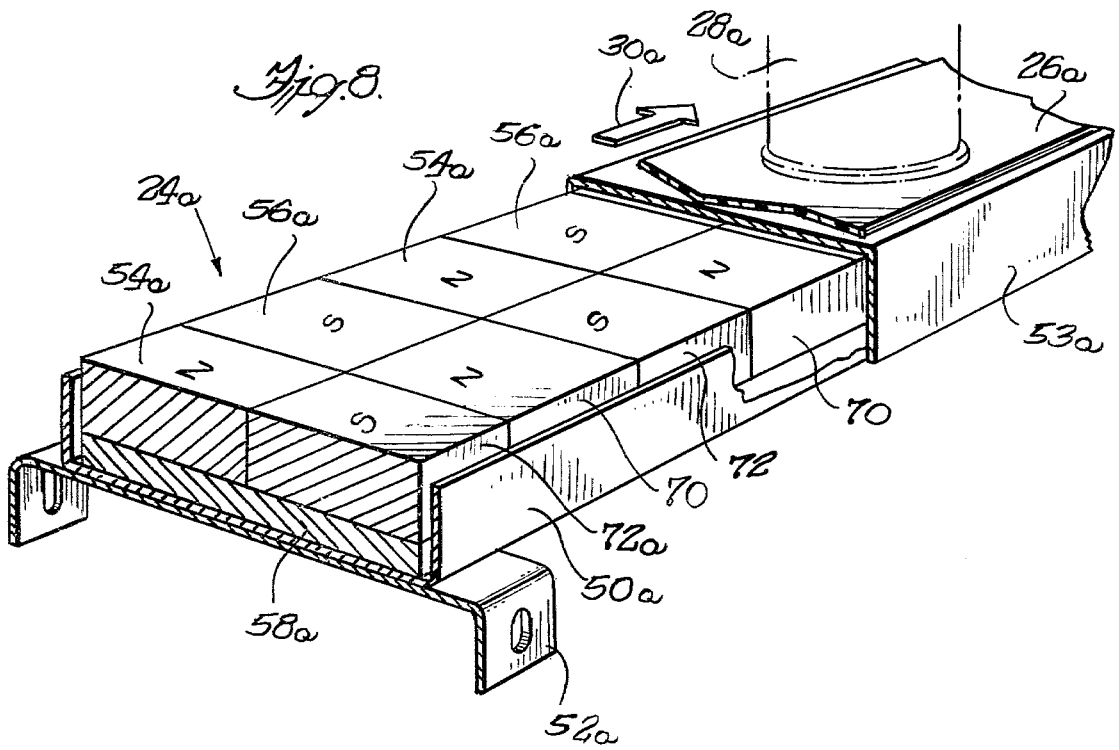

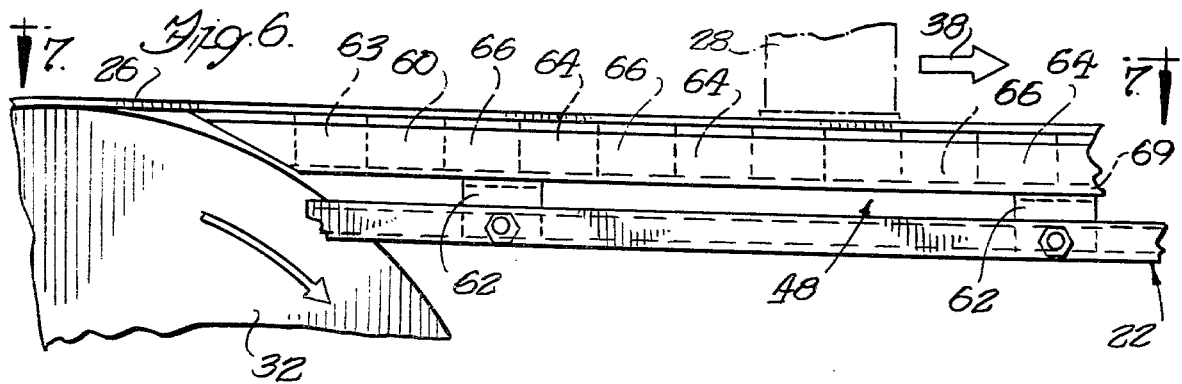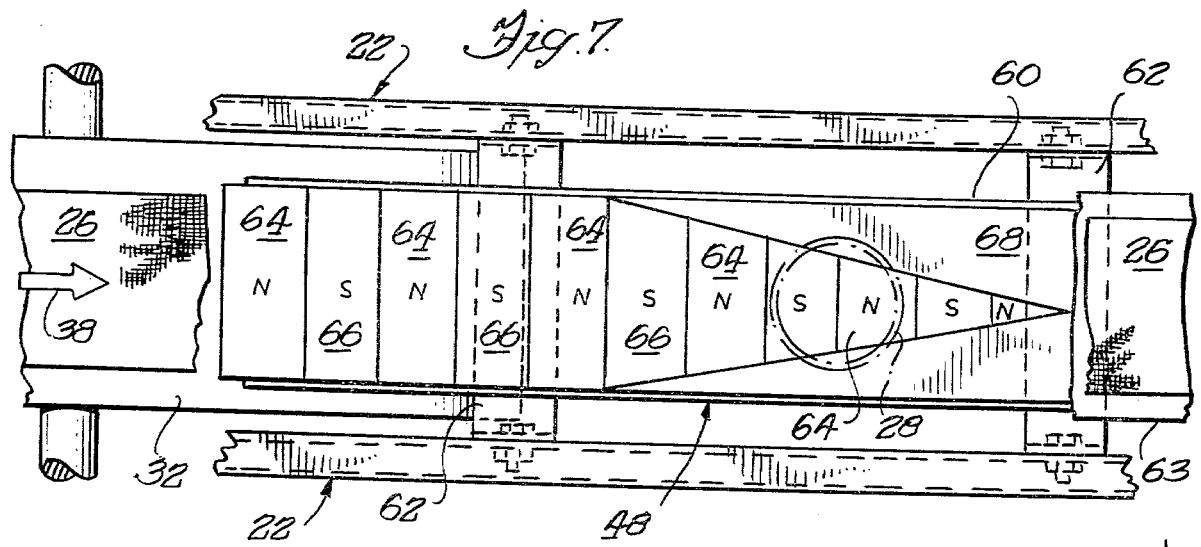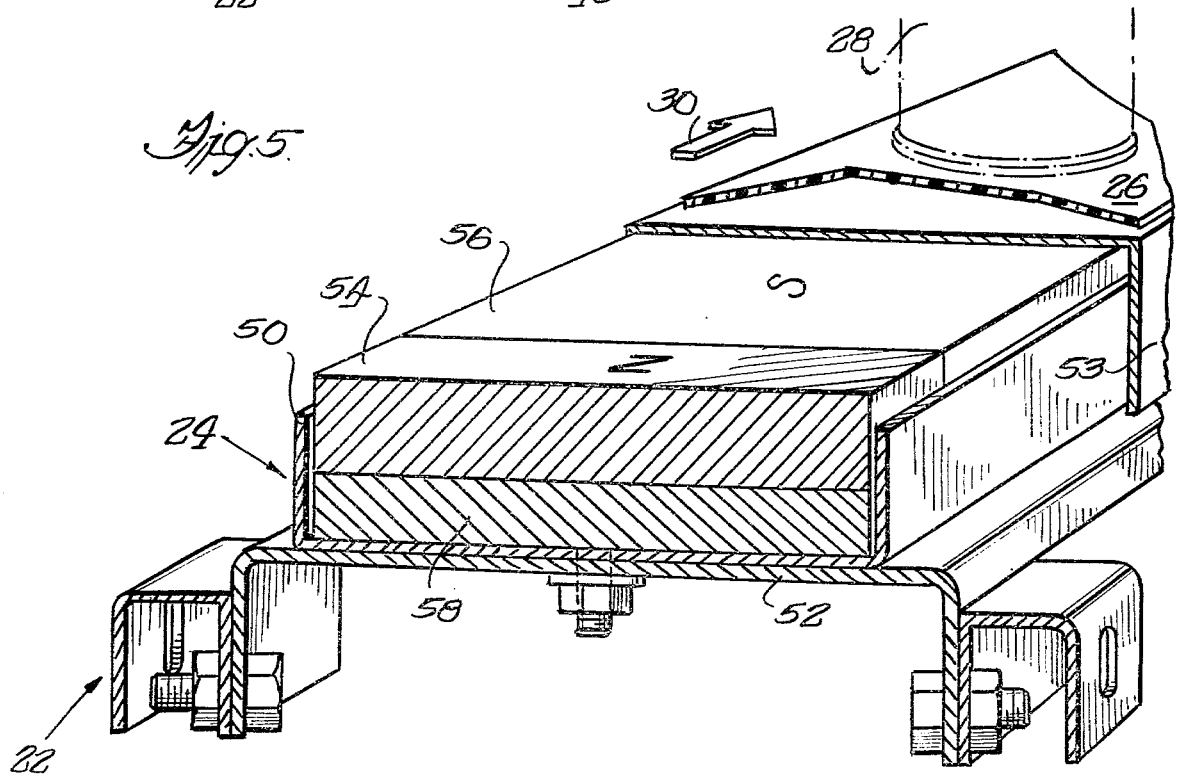

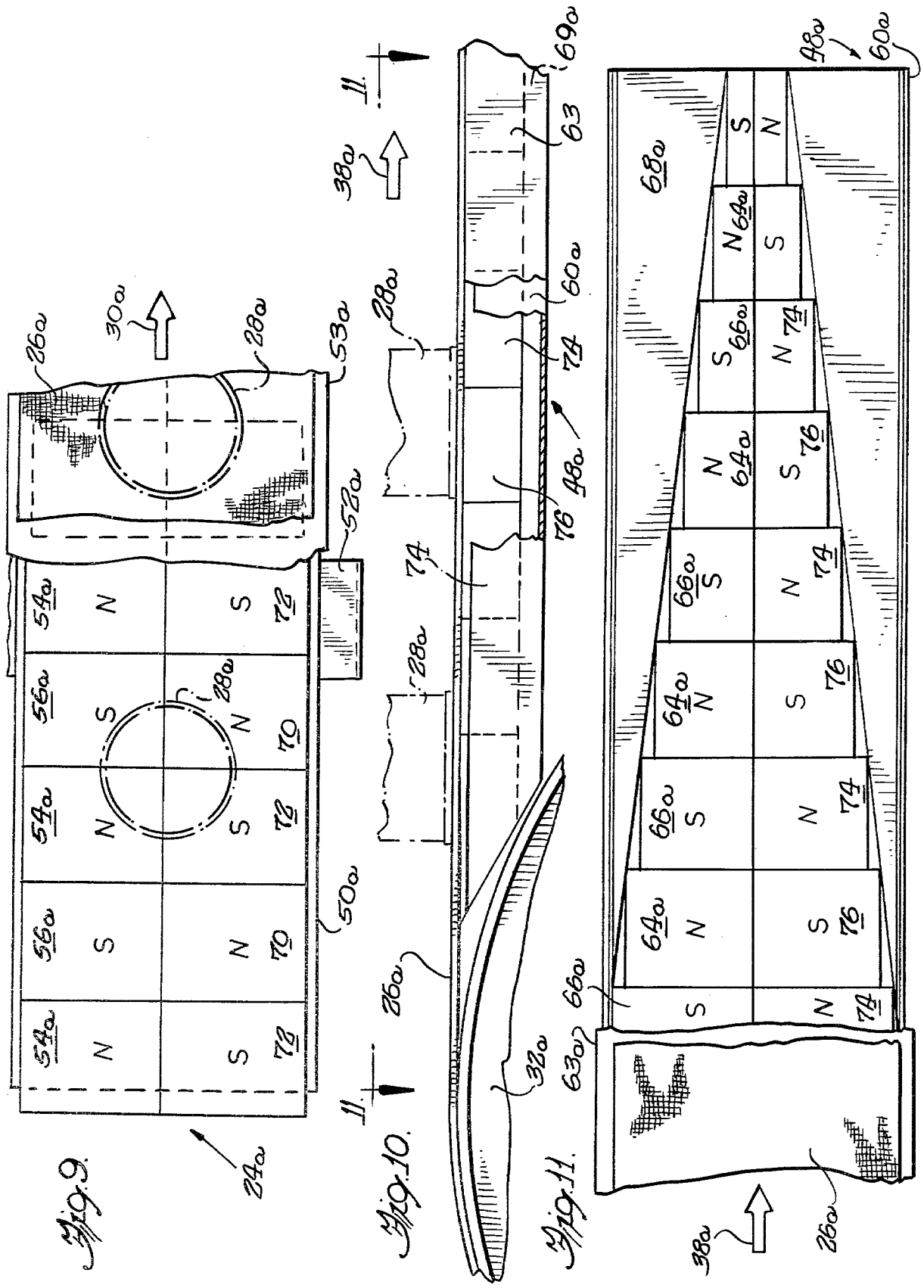

4,351,430

MAGNETIC RAIL CONSTRUCTION FOR CAN CONVEYOR

FIELD OF INVENTION

This invention relates generally to magnetic conveyor systems for transporting tinplate and drawn steel containers and the like and more particularly to the magnetic rail arrangements employed in such systems.

BACKGROUND OF THE INVENTION

Heretofore, it has been common practice to arrange a magnetic conveyor rail to display an elongate, longitudinally extending north polarity adjacent one edge and a cooperating, elongate, longitudinally extending south polarity adjacent the opposite, companion edge. Moreover, highly permeable pole plates have been assembled with permanent magnets to generate the corresponding magnet circuit. These systems have proved useful for transporting unfilled cans, especially 603×700 and larger sized cans at speeds of about 150 cans per minute. When systems of this type were used on filled cans in this size range, the results were unacceptable, as the incidences of toppled cans and resultant line jams precluded effective operation. As such, conveyors of the type illustrated in U.S. Pat. No. 3,581,872 were employed, which operated, at speeds of only 50 to 100 cans per minute, and more expensive to manufacture and operate.

SUMMARY OF THE INVENTION

Applicant has found that, contrary to industry standards and practice, a belt-conveyor magnetic rail which is arranged with laterally alternating polarity exhibits improved container attraction, making it possible to achieve relatively high speed transit of filled, large-sized cans.

Therefore, an important object of the present invention is to provide a magnetic, belt-type conveyor system in which the effectiveness of available magnetic flux is maximized.

A more general object of the invention is to provide a new and improved magnetic rail construction for can conveyor systems.

These and other objects and features of the invention will become more apparent from a consideration of the following description.

BRIEF DESCRIPTION OF THE DRAWINGS

In order that the principles of the invention may be readily understood, two embodiments thereof, applied to an elevator-type conveyor but to which the application is not to be restricted, are shown in the accompanying drawings wherein:

FIG. 1 is a perspective view on a reduced scale of an elevator-type conveyor system constructed in compliance with the present invention;

FIG. 2 is an enlarged, partially broken away, side elevational view of the conveyor system shown in FIG. 1;

FIG. 3 is a side elevational view of the magnetic rail arrangement used in the conveyor system of FIGS. 1 and 2;

FIG. 4 is an elevational view taken substantially along the line 4—4 of FIG. 3, with the traveling belt and belt support partially broken away to show details of the magnetic rail;

FIG. 5 is an enlarged perspective view of the magnetic rail arrangement of FIGS. 3 and 4;

FIG. 6 is a side elevational view showing a portion of the transition roll and the bleed-off system which is employed in taking the cans off into a horizontal travel mode;

FIG. 7 is a plan view taken substantially along the line 7—7 of FIG. 6 in order to illustrate the magnet arrangement used in the bleed-off section of the conveyor system;

FIG. 8 is a perspective view similar to the showing of FIG. 5 but illustrating a modified form of the magnetic rail circuit employed according to the present invention;

FIG. 9 is an elevational view of the magnetic arrangement illustrated in FIG. 8, with the traveling belt and belt support partially broken away to show details of the rail construction;

FIG. 10 is a side elevational view similar to the showing of FIG. 6 but illustrating a modified form of the bleed-off section; and FIG. 11 is a plan view taken substantially along the line 11—11 of FIG. 10, with the belt and associated structure partially broken away.

DETAILED DESCRIPTION OF THE INVENTION

Referring now in detail to the drawings and giving first attention to FIGS. 1 and 2, a magnetic conveyor system of the elevator type which is constructed in compliance with the present invention is indicated generally by the reference numeral 20. The conveyor system 20 broadly comprises a conveyor frame arrangement 22; an ascending magnetic rail arrangement 24; an endless, flexible traveling belt 26; and a suitable roller system which will be described more fully hereinafter. Conventional indexing and feeding equipment, including a container guide rail arrangement 27, advances filled tinplate containers 28 individually into magnetically coupled relationship at the lower end of the magnetic rail arrangement 24, the guide rail arrangement 27 desirably continuing upward along the conveyor system 20.

The filled containers 28 move in the direction of belt travel which is indicated generally by an arrow 30; and a magnetic transition roll 32 is mounted for rotation in suitable journals 34 at the upper end of rail arrangement 24 to define a directional transition zone for the tinplate containers being transported. The transition roll 32 directs the containers in an arcuate path indicated generally by an arrow 36 and into a direction of horizontal travel indicated generally by an arrow 38.

The gravitationally lower end of the belt 26 is guided over a roll 40 which is mounted in vertically positionable journals 42. Desirably, the journals 42 are resituatable by a piston-type arrangement, not shown, for adjusting tension in the belt 26. The path of belt 26 is additionally defined by a suitable number of idler rolls 46; and advantageously, an auxiliary horizontal magnetic bleed-off rail system 48 is arranged as a take-off for the containers 28 exiting the transition roll 32.

Continuing now with reference to FIGS. 3–5 inclusive, the magnetic rail arrangement 24 comprises a U-shaped channel 50 which is suitably attached to the conveyor frame 22, as by a bracket arrangement 52 and conventional screw fasteners. An inverted channel 53 of a suitable non-magnetic material is fitted over channel 50 to form a bed for the traveling belt 26.

In compliance with the features of the present invention, a first series of permanent magnets 54 is arranged in uniformly spaced-apart relationship in a row along the linear direction of the magnetic rail arrangement 24 closely adjacent the belt 26. In addition, the magnets 54 are selected to have a common north polarity. Cooperatively, a second series of permanent magnets 56 having a common south polarity is alternately interspersed with the first series of magnets 54 in the spaces provided therebetween and in abutting relationship therewith. Moreover, the respective polarities of the magnets 54 and 56 extend substantially uniformly across the top of the magnetic rail arrangement 24; and desirably, a magnetic shunt or keeper 58 is disposed beneath the magnets 54 and 56 at the root of the channel 50.

In further accord with the principles of the present invention, each of the magnets 54 and 56 is fabricated to have a dimension in the linear direction of the magnetic rail arrangement 24 which is less than the diameter of the tinplate containers 28 being transported by the conveyor sysem, as is well shown in FIGS. 3 and 4. Thus arranged with laterally alternating polarity, the magnetic rail arrangement 24 maximizes the effectiveness of available magnetic flux, producing improved container attraction and making it possible to achieve ultra-high speed transit even of filled, large-size cans.

Turning now to FIGS. 6 and 7, the horizontal rail system 48 is seen to comprise an elongate, U-shaped channel 60 which opens in a generally upward direction toward the traveling belt 26, the channel 60 being supported on the conveyor frame 22 by suitable means, including brackets 62. An inverted, non-magnetic channel 63 closes channel 60 and provides support for the belt 26. In compliance with the magnetic principles of the present invention, the channel 62 serves as a housing for a first series of permanent magnets 64 which are arranged in uniformly spaced-apart relationship in a row along the linear direction of container travel corresponding with the direction indicated by arrow 38. The permanent magnets 64 are disposed closely adjacent the traveling belt 26 therebeneath and are selected to exhibit a common north polarity. Cooperatively, a second series of permanent magnets 66 of a common south polarity are alternately interspersed with the magnets 64 in the spaces therebetween, as is clearly shown in FIG. 7.

As with the magnets 54 and 56 previously described, the permanent magnets 64 and 66 in the horizontal rail system 48 are fabricated to have a dimension in the direction of container travel which is less than the diameter of tinplate containers 28 being transported by the conveyor system. In addition and in further compliance with the principles of the present invention, the magnets 64 and 66 are of progressively diminishing dimension transverse to the direction of belt travel, as is well illustrated in FIG. 7. In other words, the magnets 64 and 66 taper down in the direction of container travel. Thus arranged, the magnetic interaction between the tinplate containers and the horizontal rail section diminishes as the containers are carried away from the directional transition roll 32 and hence may be readily handled mechanically, rather than magnetically, after leaving the bleed-off rail system 48.

Conveniently, the spaces between the sides of channel 60 and the tapering permanent magnets 64 and 66 are filled with a suitable non-magnetic material such as wooden or plastic blocks 68; and desirably, a magnetic shunt or keeper 69 is situated at the root of channel 60 for magnetically coupling the several permanent magnets 64 and 66.

In order to enhance the understanding of the invention, a modified embodiment thereof is illustrated in FIGS. 8-11; and because the embodiment of FIGS. 8-11 includes many elements corresponding to those in the embodiment of FIGS. 1-7, like numerals have been used to designate like parts with the suffix letter "a" being employed to distinguish those parts associated with the embodiment of FIGS. 8-11.

The magnetic rail arrangement 24a which is illustrated in FIGS. 8 and 9 is characterized by the provision of additional series of permanent magnets of alternating polarity laterally adjacent the permanent magnets 54a and 56a. As is shown, a series of permanent magnets 70 having north polarity facing the traveling belt 26a are spaced-apart to receive in alternate fashion a series of permanent magnets 74 having south polarity facing the belt 26a. As will be noted in the drawings, the south polarity magnets 72 are arranged laterally adjacent the north polarity magnets 54a whereas the north polarity magnets 70 are arranged laterally adjacent the south polarity magnet 56a, all in a generally checkerboard pattern. In addition, the permanent magnets 70 and 72, like the permanent magnets 54a and 56a, are selected to have a dimension in the direction of belt travel which is less than the diameter of tinplate containers 28a being transported by the conveyor system, as is shown in FIG. 9. Furthermore, all of the magnets 54a, 56a, 70 and 72 are disposed in closely abutting relationship with the immediately adjacent magnets.

Turning to a consideration of FIGS. 10 and 11, the bleed-off rail arrangement of the modified embodiment likewise employs additional series of permanent magnets arranged in laterally abutting relationship with the permanent magnets 64a and 66a, generally in checkerboard pattern. Specifically, permanent magnets 74 having north polarity facing the traveling belt 26a are uniformly spaced apart and alternately interspersed with permanent magnets 76 having south polarity facing the traveling belt. In other words, the horizontal bleed-off rail system 48a is similar to the bleed-off system 48 described with reference to FIGS. 1-7 inclusive, including the tapering of the magnets in the direction of belt travel indicated by the arrow 38a.

While particular embodiments of the invention have been shown and described, it should be understood, of course, that the invention is not limited thereto since many other modifications may be made; and it is, therefore, contemplated to cover by the present application may such modifications as fall within the true spirit and scope of the appended claims.

The invention is claimed as follows:

1. In a magnetic conveyor system, the combination comprising: traveling conveyor means adapted to be transported in a predetermined linear direction; and an elongate magnetic rail extending in said linear direction and comprising a first plurality of permanent magnets having a first, common polarity confronting said conveyor means and being arranged in uniformly spaced-apart relationship in a row along said predetermined linear direction closely adjacent said conveyor means; and a second plurality of permanent magnets having a second, common polarity confronting said conveyor means and being opposite the polarity of said first plurality of magnets, said second plurality of magnets being alternately interspersed with said first plurality of magnets in the spaces therebetween said first and second plurality of magnets being in abutting surface-to-surface contact with the magnets immediately adjacent thereto along surfaces of the respective magnets which extend transversely to the linear direction of travel of the conveyor means, such that any one of said magnets of a given polarity facing said support means, except those at the end of said magnetic rail, will have the transverse surfaces thereof in abutting engagement on opposite sides thereof with magnets of an opposite polarity orientation, and common shunt plate means upon which said first and second plurality of magnets are supported, with the sides thereof opposite that facing said support means being engaged with said shunt plate means, to provide a plurality of flux paths of substantial strength.

2. In a magnetic conveyor system, the combination according to claim 1 wherein each of said magnets is selected to have a dimension in said predetermined linear direction which is less than the diameter of tinplate containers being transported by said conveyor system.

3. In a magnetic conveyor system, the combination according to claim 1 wherein said magnets are of progressively diminishing dimension transverse to the direction of belt travel.

4. In a magnetic conveyor system, the combination comprising: traveling support means adapted to be transported in a predetermined linear direction; and an elongate magnetic rail extending in said direction and comprising, a first plurality of permanent magnets having a first, common polarity confronting said support means and being arranged in uniformly spaced-apart relationship in a row along said predetermined linear direction closely adjacent said support means; and a second plurality of permanent magnets having a second common polarity confronting said support means and being opposite the polarity of said first plurality of magnets, said second plurality of magnets being alternately interspersed with said first plurality of magnets in the spaces therebetween, and said front and second plurality of adjacent magnets being in abutting surface-to-surface contact with magnets adjacent thereto, and said magnetic rail further comprising a third plurality of permanent magnets of said first polarity disposed laterally adjacent said second plurality of permanent magnets and being of like number therewith and in abutting surface-to-surface contact therewith; and a fourth plurality of permanent magnets of said second polarity alternately interspersed with said third plurality of permanent magnets, and in abutting surface-to-surface contact with both said first and said third pluralities of magnets, such that any one of said magnets of a given polarity facing said support means, except those at the extreme ends of said magnetic rail, will be in abutting engagement on three sides thereof with magnets disposed oppositely of said one magnet.

5. In a magnetic conveyor system according to any of claims 1-4, wherein the magnetic rail employs magnets that extend substantially across the entire width of said magnetic rail.

* * * * *

UNITED STATES PATENT AND TRADEMARK OFFICE
CERTIFICATE OF CORRECTION

PATENT NO. : 4,351,430
DATED : September 28, 1982
INVENTOR(S) : WALLACE W. MOJDEN It is certified that error appears in the above-identified patent and that said Letters Patent is hereby corrected as shown below:

Column 4, line 18, change "74" to --72--;

Column 4, line 51, change "may" to --any--;

Column 6, line 9, change "front" to --first--.

Signed and Sealed this

Twenty-first Day of December 1982

[SEAL]

Attest:

GERALD J. MOSSINGHOFF

Attesting Officer     Commissioner of Patents and Trademarks